United States Patent
Messing et al.

(10) Patent No.: US 7,957,844 B2
(45) Date of Patent: Jun. 7, 2011

(54) DEVICE AND A METHOD FOR POWER BALANCING

(75) Inventors: Lars Messing, Malmö (SE); Daniel Karlsson, Malmö (SE)

(73) Assignee: ABB AB, Västerås (SE)

( * ) Notice: Subject to any disclaimer, the term of this patent is extended or adjusted under 35 U.S.C. 154(b) by 314 days.

(21) Appl. No.: 10/544,030

(22) PCT Filed: Jan. 26, 2004

(86) PCT No.: PCT/SE2004/000101
§ 371 (c)(1),
(2), (4) Date: Jun. 26, 2006

(87) PCT Pub. No.: WO2004/068672
PCT Pub. Date: Aug. 12, 2004

(65) Prior Publication Data
US 2006/0255791 A1 Nov. 16, 2006

(30) Foreign Application Priority Data
Jan. 30, 2003 (SE) ........................... 0300243

(51) Int. Cl.
*G05B 6/02* (2006.01)
*G05D 3/12* (2006.01)
*H02P 1/24* (2006.01)
*G01R 17/02* (2006.01)

(52) U.S. Cl. ............ 700/286; 318/621; 318/729; 324/98

(58) Field of Classification Search ................... 700/286; 361/68; 324/98; 318/621, 729, 62
See application file for complete search history.

(56) References Cited

U.S. PATENT DOCUMENTS

| 4,183,072 A | * | 1/1980 | Takagi et al. .................... 361/68 |
| 4,656,413 A | * | 4/1987 | Bourbeau ........................ 322/47 |
| 4,785,405 A | * | 11/1988 | Hasegawa et al. ............ 700/297 |
| 5,225,712 A | * | 7/1993 | Erdman .......................... 290/44 |
| 6,519,537 B1 | * | 2/2003 | Yang .............................. 702/58 |
| 6,525,504 B1 | * | 2/2003 | Nygren et al. ................ 318/700 |

(Continued)

FOREIGN PATENT DOCUMENTS

| SU | 1721707 A1 | 3/1992 |
| SU | 1746464 A1 | 7/1992 |
| WO | WO 8908342 A1 | 9/1989 |

OTHER PUBLICATIONS

Lind et al.,"Distribution System Modeling for Voltage Stability Studies", 1995 IEEE p. 1677-1682.*

(Continued)

*Primary Examiner* — Ramesh B Patel
*Assistant Examiner* — Thomas Stevens
(74) *Attorney, Agent, or Firm* — Venable LLP; Eric J. Franklin (57) ABSTRACT

A method for stabilization of the power balance in an electric power system including a number of nodes. An instantaneous value of the mains frequency of the electric power system is sensed. In dependence on the frequency deviation of the instantaneous value from a reference frequency value, a selected part of the electric power system, connected in a node, is disconnected in the node. A voltage amplitude value is sensed in the node. A measure of the magnitude of the deviation of the voltage amplitude value from a reference amplitude value is formed. A time lag is formed in dependence on the measure of the magnitude. The part of the electric power system is disconnected in dependence on the time lag.

16 Claims, 6 Drawing Sheets

U.S. PATENT DOCUMENTS 6,670,721 B2 * 12/2003 Lof et al. .................. 290/44
6,678,134 B2 * 1/2004 Sugiura et al. .............. 361/68
7,076,592 B1 * 7/2006 Ykema ..................... 710/305
7,248,986 B2 * 7/2007 Klijn et al. ................ 702/115

OTHER PUBLICATIONS

Fillatre et al., "A Power Tool for Dynamic Simulation of Unbalanced Phenomena", 1997 IEEE p. 526-531.*

Kezunovic et al., "An Expert System for Transmission Substation Event Analysis" 1993 IEEE p. 1942-1949.*

Okafor et al., Power System Stabilizer for the Nigerian Power System—Design and Simulation 1999 IEEE p. 803-807.*

"IEEE Recommended Practice for Monitoring Electrical Power Quality", 1995, IEEE Standards Board, 76 pages.*

Prabha Kundur; Power System Stability and Control; Underfrequency Load Shedding; Jan. 1, 1994; pp. 623-626; McGraw-Hill Professional.

* cited by examiner

DEVICE AND A METHOD FOR POWER BALANCING

TECHNICAL FIELD

The present invention relates to a method for power balancing in an electric power system, and to a device for carrying out the method.

The device comprises electronic measuring and control equipment intended to be used in an electric power system.

BACKGROUND ART

It is known that an electric power system is planned and designed for normal operation with respect to determined dimensioning criteria as regards system variables. The nominal frequency of the electric power system is one such variable. The mains frequency deviation of the electric power system from the nominal frequency is a measure of the power balance in the electric power system.

When a disturbance arises in an electric power system or the electric power system is abnormally loaded, an impermissible condition arises in the electric power system beyond said dimensioning criteria. For the purpose of cancelling this impermissible condition, protective functions are built into the electric power system, for example implemented by utilizing protective devices such as relay protection devices at defined connection points, nodes, in the electric power system. Said relay protection devices initiate disconnection of parts of the load or the production in the electric power system, in dependence on instantaneous values of said system quantities in said nodes.

Power balancing by means of underfrequency-controlled load disconnection is a known method that is used in many electric power systems as a protective function for avoiding a breakdown if the mains frequency falls below the setting for the process. The power balancing is carried out according to the prior art, for example by means of frequency relay protection devices. Load disconnection is performed with a mutual order between all the frequency relay protection devices included in the power system according to a predetermined connection plan. For a general description of load disconnection and for selection of a connection plan, reference is made to (P. Kundur): Power System Engineering Series, Power System Stability and Control, 1993, EPRI Editors, pages 623-626.

A frequency relay protection device may utilize as tripping criterion the mains frequency of the electric power system; another alternative is to utilize the derivative of the frequency.

Within a geographical region with a fixed nominal frequency, for example 50 Hz or 60 Hz, the mains frequency is allowed to vary within a fixed frequency interval comprising the nominal frequency. When there is a need for power balancing in such an electric power system, the load disconnection occurs in a fixed number of steps according to a connection plan, determined by the network operating management for said electric power system, at different frequency levels and time lags in different nodes, with the frequency level and the time lag in dependence on the relevant frequency level based on current regulations for the region in question. For each step, a function with direct load disconnection and/or a time-lag function with a definite time-lag load disconnection may be carried out.

Within Nordel, where the nominal frequency is 50 Hz, the mains frequency is normally allowed to vary between 49.9 Hz and 50.1 Hz. When a need for power balancing arises in an electric power system within Nordel, the load disconnection takes place as mentioned above in a fixed number of steps according to a connection plan, determined by the network operating management for said electric power system, at different frequency levels and time lags in different nodes, with the frequency level and the time lag in dependence on the relevant frequency level based on Nordel's regulations. Typical values for the time lag are 0.15 s for direct load disconnection and 20 s for definite time-lag disconnection.

A frequency relay protection device that has a time lag for definite time lag set initially when the system is put into service may be reset with a new time lag, for example after a load disconnection has been initiated by said frequency relay protection device, whereby said resetting with a new time lag is made with a view to optimizing the setting of said frequency relay protection device in the electric power system in question. This method changes the valid connection plan since the frequency relay protection devices are mutually related according to this connection plan, which results in resetting of also the other frequency relay protection devices in the electric power system.

Production disconnection is another known method that is used in many electric power systems as a protective function for avoiding a breakdown in the electric power system. Production disconnection is overfrequency-controlled and is carried out with a frequency relay protection device of the same type as described above for underfrequency control but the frequency and time parameters of which have been given other values.

However, it may happen that such load disconnection or production disconnection is performed in a node, connection point, which is not suitable for the present condition of the power system, which leads to said disconnection aggravating the impermissible condition, hence activating additional protective functions, which further aggravates the impermissible condition and causes a breakdown to occur in the electric power system. To make possible continued operation, it is thus of great importance at which connection points, nodes, in the electric power system that the load disconnection is made.

Power balancing by means of underfrequency-controlled load disconnection or overfrequency-controlled production disconnection takes place as described above according to the prior art by means of disconnection of load or production. Admittedly, said disconnection is performed in dependence on the instantaneous mains frequency, but according to a connection plan with a predetermined selection of mutual order between the connection points, nodes, of the electric power system. However, this may result in disconnection of a node, connection point, that is unsuitable for the current condition of the power system.

SUMMARY OF THE INVENTION

It is an object of the invention to provide a method for power balancing in an electric power system, and a device for carrying out the method.

According to the invention, this object and other objects are achieved by sensing, in an electric system comprising a number of nodes, an instantaneous value of the mains frequency of the electric power system and, in dependence on the frequency deviation of said instantaneous value from a reference frequency value, by disconnecting a selected portion of the electric power system connected in a node, in said node, and by sensing a voltage amplitude value in said node, and by forming a measure of the magnitude of the deviation of said voltage amplitude value relative to a reference amplitude value, and by forming a time lag in dependence on said measure of the magnitude, and by disconnection said part of the electric power system in dependence on said time lag.

The above-mentioned voltage amplitude value represents, for example, a mean value, a root-mean square (RMS) value, or a symmetrical component in a three-phase voltage.

In another advantageous development of the invention, said measure of the magnitude is formed as the absolute value of a difference of said voltage amplitude value and said reference amplitude value.

In a further advantageous development of the invention, said measure of the magnitude is formed as the quotient of the instantaneous amplitude value and the reference amplitude value.

In a still further advantageous development of the invention, said time lag is formed as an inverse-time lag in dependence on said measure of the magnitude.

In yet another advantageous development of the invention, said time lag is formed as a function of the logarithm of said measure of the magnitude.

In still another advantageous development of the invention, said time lag is formed according to a calculation model in dependence on said measure of the magnitude, or in dependence on a magnitude, derived from the electric ac voltage, such as, for example, the time derivative of the amplitude of the ac voltage. Said time lag may also receive a predetermined value, such as a definite time lag.

In yet another advantageous development of the invention, said selected part of the electric power system is a load and said reference frequency value is selected as a smallest permissible instantaneous value of the mains frequency of the electric power system and said part of the electric power system is disconnected if said frequency deviation indicates that the instantaneous value of the mains frequency of the electric power system falls below said reference frequency value.

In still another advantageous development of the invention, said selected part of the electric power system is power-producing and said reference frequency value is selected as a largest permissible instantaneous value of the mains frequency of the electric power system and said part of the electric power system is disconnected if said frequency deviation indicates that the instantaneous value of the mains frequency of the electric power system exceeds said reference frequency value.

In another advantageous development of the invention, the device comprises computer program products containing computer architecture or computer program code comprising program instructions that control a computer or a computer process to carry out or simulate a method for stabilizing the power balance in an electric power system in accordance with the invention.

In still another advantageous development of the invention, a computer program comprises program instructions that control a computer or a computer process to control or simulate a method for stabilizing the power balance in an electric power system in accordance with the invention.

In a further advantageous development of the invention, a computer program controlling a computer or a computer process to control or simulate a method for stabilizing the power balance in an electric power system in accordance with the invention is recorded on one or more computer-readable media.

Additional developments of the invention will be clear from the following description and claims.

BRIEF DESCRIPTION OF THE DRAWINGS

The invention will be described in greater detail by description of embodiments with reference to the accompanying drawings, wherein.

DESCRIPTION OF THE PREFERRED EMBODIMENTS

The following description relates both to the method and to the device.

The device comprises members shown in the figures as flow charts and block diagrams. The block diagrams may be conceived as both a signal flow chart and a block diagram describing a piece of equipment for the device. A function carried out in a flow chart or by a block shown in the block diagram may in applicable parts be implemented by analog and/or digital technique, but is advantageously carried out as a program in a microprocessor, in a computer program, or as a computer program code element carried out in a computer or a computer process. It is to be understood that when the flows and blocks shown in the figure are designated, in a physical embodiment, as a device, an apparatus, etc., they are to be conceived, particularly when the function is implemented as software in a microprocessor, as means for achieving a desired function. Consequently, as it may be in this case, the expression "signal" may also be interpreted as a value generated by a computer program and also appear in this form only. The blocks below are only given a functional description since these functions in a manner known per se may be implemented by a person skilled in the art.

So as not to burden the description by distinctions that are self-explanatory to the person skilled in the art, generally the same designations are used for the magnitudes that occur in lines, protective devices and loads, as for the measured values and signals/calculated values which correspond to said magnitudes and which are supplied and treated in the protective device described in the following.

Figure 1:
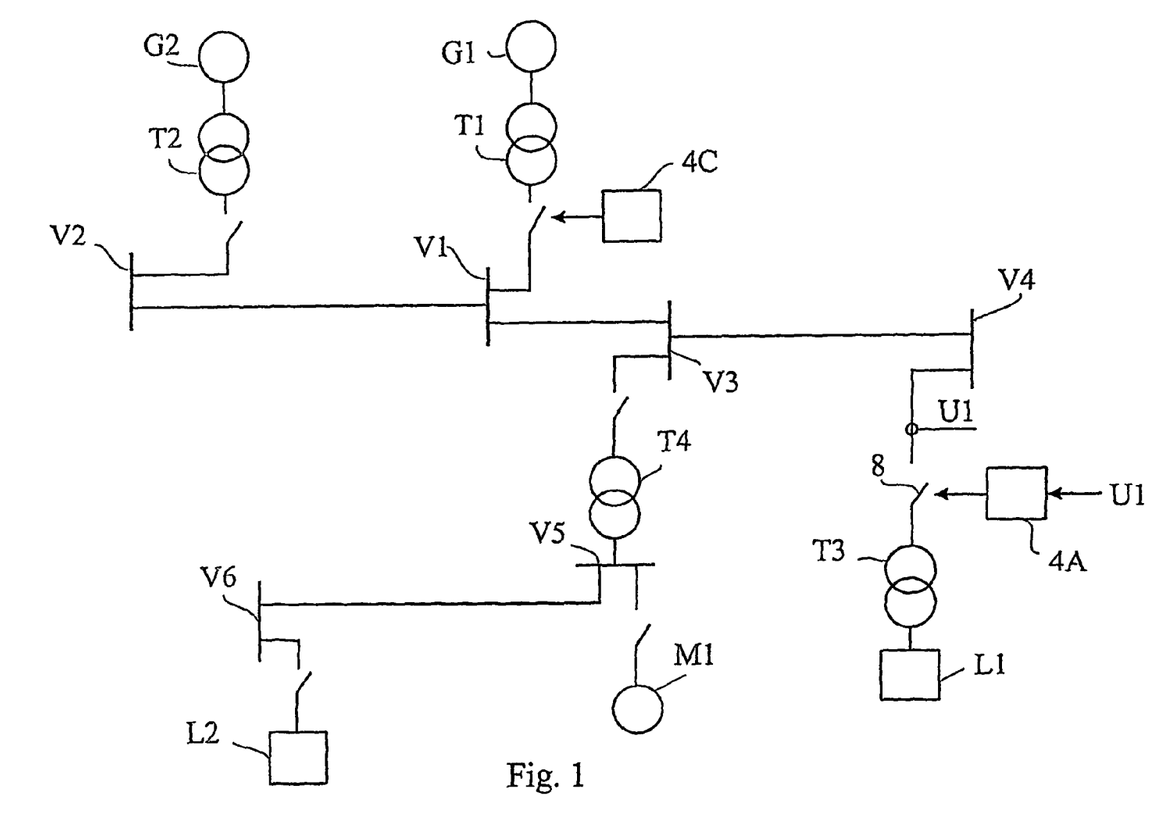
FIG. 1 shows an electric power system comprising a protective device according to the prior art, and an embodiment of the invention as a single-line diagram and a block diagram.

FIG. 1 shows as a block diagram and a single-line diagram an electric power system comprising a number of nodes V1, V2, ..., electric equipment such as production units, generators G1, G2, ..., motors M1, ..., transformers T1, T2, ..., loads L1, L2, .... Each node of the electric power system is associated with part of the electric power system such as, for example, a busbar, one or more loads, ac machines, or production units such as generators. To a selection of the nodes there is also connected a protective device for each one of the selected nodes, whereby said protective device comprises, for example, a frequency relay. The figure also shows two such protective devices, namely, 4A which is utilized as underfrequency protective device, and 4C which is utilized as overfrequency protective device. The protective device 4A, which is utilized as underfrequency protective device, is connected to one of the nodes V4, whereby said protective device makes possible power balancing with known technique by means of frequency-controlled load disconnection in said node, in this case of a transformer T3, connected to the node, with a load L1. To an additional node V1 there are connected the protective device 4C, which is utilized as overfrequency protective device, and a transformer T1 connected to a generator G1, whereby said protective device makes possible power balancing by means of frequency-controlled production disconnection. The load disconnection and the production disconnection, respectively, are carried out in dependence on the sensed frequency prevailing in the respective nodes V4 and V1.

Figure 2:
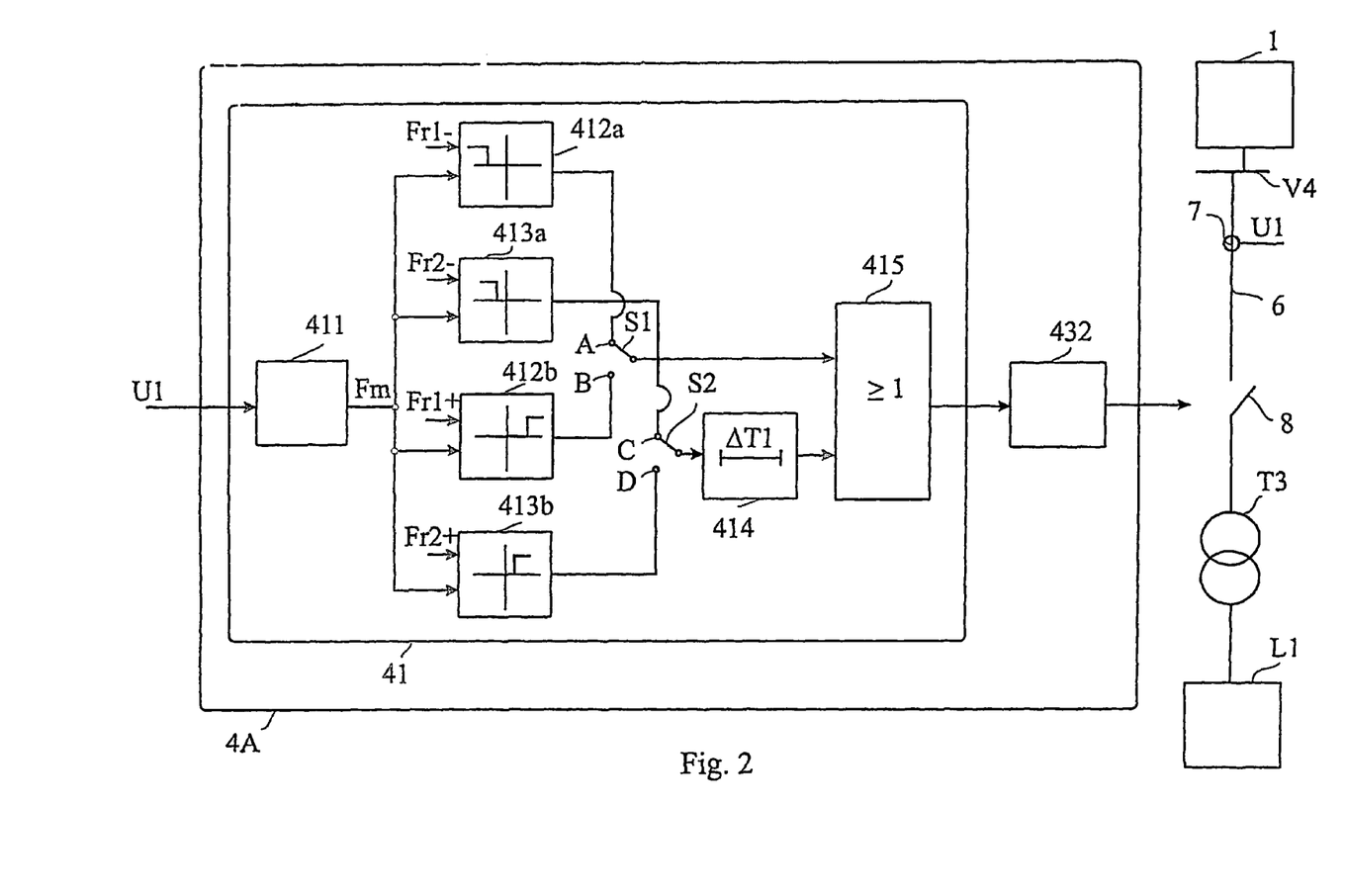
FIG. 2 shows an embodiment of a protective device according to the prior art as a single-line diagram and a block diagram.

FIG. 2 shows in more detail, as a block diagram and a single-line diagram, the above-described protective device 4A in node V4, load L1, and a transformer T3, as well as an electric line 6, a voltage-measuring device 7, a current interrupter 8, and a power network part 1 comprising the rest of the electric power system. The protective device comprises in a known manner a frequency relay 41 comprising microprocessors with associated auxiliary electronics, and an operating circuit 432.

In said node there are connected the transformer with a load and the power network part comprising the rest of the electric power system. The electric line connects the node with the transformer, and the interrupter is connected between the node and the transformer in said line. Said protective device is connected to the interrupter, whereby the protective device is intended to control the current interrupter. Between the transformer and the node, also the voltage-measuring device, which in this case is a voltage transformer, is connected to the line for the purpose of sensing a measured value representing an ac voltage which is utilized for forming a value representing the instantaneous mains frequency.

The present value of the mains frequency is, as known, common to the whole synchronous ac voltage system, and this is utilized in the protective device with an embodiment according to the invention as a fault-indicating function.

It is to be understood that the following description of a frequency relay is a model of a frequency relay, and so as not to burden the representation with design assumptions which are obvious to a person skilled in the art, it is assumed, for example, that said selector and timing circuit are models for a selector and a timing circuit, for example implemented as digital circuits or as program code in a computer program, and in a physical implementation of such a frequency relay it is also assumed that this relay, in a known manner, comprises auxiliary electronics and operating means.

The frequency relay comprises in a known manner a signal input for the above-mentioned measured value, and a number of signal outputs, a first measurement value-forming circuit 411, a first comparison circuit 412a, a second comparison circuit 413a, a third comparison circuit 412b, a fourth comparison circuit 413b, a first timing circuit 414, and an OR circuit 415. Further, the frequency relay comprises a selector with two positions which are set with two synchronizing contacts S1 and S2. In a first position (A, C) the frequency relay is utilized for load disconnection, and in a second position (B, D) the frequency relay is utilized for production disconnection.

FIG. 2 shows the selector (S1, S2) set in the first position (A, C) for load disconnection. The frequency relay thus utilizes a link for direct disconnection comprising the first comparison circuit 412a, and a constant-time link, comprising the second comparison circuit 413a as well as the first timing circuit 414.

The measuring device continuously senses an ac voltage that is supplied to the load, and in dependence thereon the measuring device forms an ac voltage-representing measured value U1 that is supplied to the frequency relay in the protective device. The frequency relay senses said ac voltage-representing measured value at selected time intervals. A typical time interval is about 1 ms between each sensing of the ac voltage.

The frequency relay is supplied with the ac voltage-representing measured value U1, and the first measured value-forming circuit 411 in the frequency relay forms, at regular intervals in dependence thereon, a value representing an instantaneous value of the mains frequency Fm of the electric power system.

The first and second comparison circuits 412a and 413a, respectively, are then simultaneously supplied with the instantaneous value of the mains frequency Fm. The first comparison circuit 412a in the frequency relay is simultaneously supplied with a first reference frequency value Fr1−. In the first comparison circuit, any frequency deviation of the instantaneous value of said mains frequency from the first reference frequency value is then detected. If the first comparison circuit 412a detects a frequency deviation in such a way that the instantaneous value of the mains frequency falls below said first reference frequency value, an activating signal is applied to the OR circuit 415.

If at least one activating signal is applied to the OR circuit, the OR circuit, in its turn, applies an activating signal to the operating circuit, the operating circuit 432 then activating the protective device-controlled current interrupter 8 which thus breaks the current in the line 6 between said node V1 and the transformer T3, as a load disconnection.

As mentioned above, the instantaneous value of the mains frequency Fm and a second reference frequency value Fr2− are supplied to the second comparison circuit 413a. In the second comparison circuit 413a, any frequency deviation of the instantaneous value of the mains frequency from the second reference frequency value is detected. If the second comparison circuit detects a frequency deviation in such a way that the instantaneous value of the mains frequency falls below said second reference frequency value, and if the first timing circuit 414 detects that the frequency deviation remains, corresponding to a time lag ΔT1, an activating signal is supplied to the OR circuit. As described above, the OR circuit, in its turn, activates the operating circuit that activates the current interrupter which breaks the current in line 6, in this case as a definite time-lag load disconnection.

Said reference frequency values are selected such that the first reference frequency value Fr1− is selected to represent a lower frequency than the second reference frequency value Fr2−.

For production disconnection, when a power-producing part of the electric power system is disconnected, the selector (S1, S2) is set in the second position (B, D). The frequency relay then utilizes a link for direct disconnection comprising the third comparison circuit 412b, and a constant-time link comprising the fourth comparison circuit 413b as well as the first timing circuit 414.

Said instantaneous value of the mains frequency Fm and a third reference frequency value Fr1+ are supplied to the third comparison circuit 412b. In the third comparison circuit, any frequency deviation of the instantaneous value of the mains frequency from the third reference frequency value is detected. If the third comparison circuit detects a frequency deviation in such a way that the instantaneous value of the mains frequency exceeds said third reference frequency value, an activating signal is supplied to the OR circuit.

Simultaneously with the instantaneous value of the mains frequency Fm being supplied to the third comparison circuit 412b, this frequency value and a fourth reference frequency value Fr2+ are also supplied to the fourth comparison circuit 412b in the frequency relay. In the fourth comparison circuit, any frequency deviation of the instantaneous value of the mains frequency from the fourth reference frequency value is detected. If the fourth comparison circuit 413*b* detects a frequency deviation in such a way that the instantaneous value of the mains frequency of the electric power system exceeds said fourth reference frequency value, and if the first timing circuit 414 detects that the frequency deviation remains during a time interval corresponding to a time lag ΔT1 with a value in accordance with the valid connection plan for the system, an activating signal is supplied to the OR circuit.

For production disconnection, the third reference frequency value Fr1+ is selected larger than the fourth reference frequency value Fr2+.

Time lag and reference amplitude values are selected and adjusted according to the predetermined valid connection plan for the electric power system mentioned.

It is to be understood that also an activating signal for direct disconnection is created with a time lag, preferably from mechanical delay in the interrupter and operating time of the frequency relay, but that this time lag which is of the order of tenths of a second is designated direct, in relation to the time lag in the constant-time link which may be of the order of some ten seconds or so.

It is also to be understood that for a frequency relay, the constant-time link, comprising the second comparison circuit 413*a* and the first timing circuit 414 for load disconnection, or the fourth comparison circuit 413*b* and the first timing circuit 414 for production disconnection, is functionally omitted.

Figure 3A:
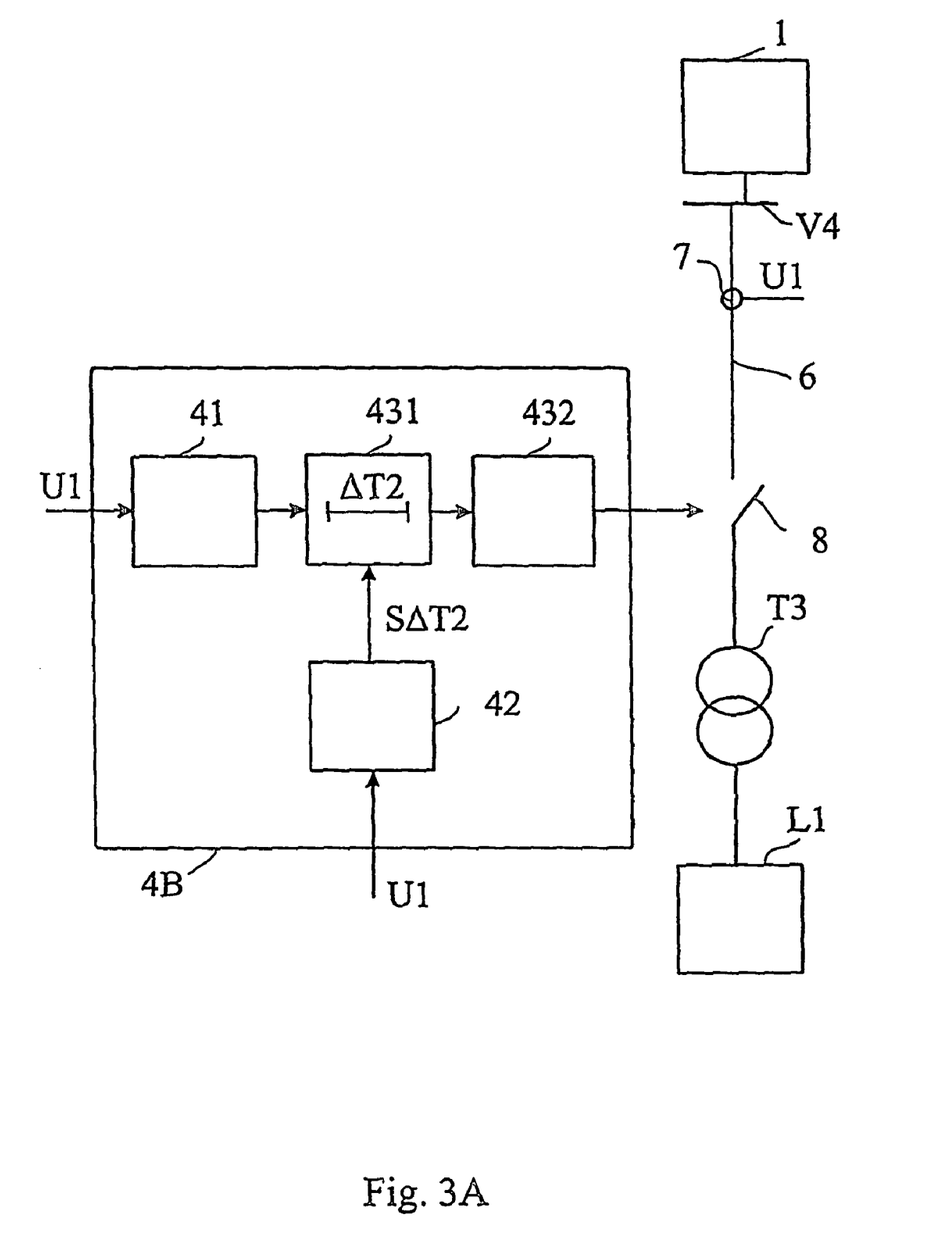
FIG. 3A shows an embodiment of the invention as a single-line diagram and a block diagram.

FIG. 3A shows as a block diagram and a single-line diagram an electric power system comprising an embodiment of the invention implemented in a protective device 4B comprising microprocessors with associated auxiliary electronics. Said protective device is connected in a node V4 in an electric power system also comprising a load L1, a transformer T3, an electric line 6, a measuring device 7, and a current interrupter 8, as well as a power network part 1 comprising the rest of the electric power system, said electric power system being composed in the same way as the electric power system described in FIG. 2 above.

The load, the transformer and the measuring device, in this case a voltage transformer, as well as the power network part are connected to said node V4 via the line in the same way as in the electric power system shown in FIG. 2. The protective device 4B is intended to control the current interrupter. The protective device having a design according to the invention is connected to the current interrupter in the same way as described above for the protective device having a design according to the prior art.

The protective device 4B having a design according to the invention comprises a frequency relay 41, a calculating member 42, a second timing circuit 431, and an operating circuit 432. The frequency relay 41 has a design and function according to the prior art, as described above for the protective device 4A. In this example, the frequency relay is set for load disconnection. It is to be understood that also the following description is a model. For example, it is assumed that said timing circuit is a model for a timing circuit and that said calculating unit is a model for a calculating unit, implemented, for example, as digital circuits or as program code in a computer program.

According to this embodiment of the invention, an activation order to said current interrupter is formed as follows.

The ac voltage-representing measured value U1 is simultaneously supplied to the calculating unit 42 and the frequency relay 41 in the protective device 4B in the embodiment according to the invention.

The second timing circuit 431 has a time lag that may be influenced, such as a time lag ΔT2. In the calculating unit 42, the instantaneous voltage amplitude of the ac voltage is sensed, and in dependence thereon a selecting function is performed in which the second time lag ΔT2 is selected, and in dependence thereon a signal SΔT2, representing the second time lag ΔT2, is formed in said calculating unit. By supplying said signal to the second timing circuit, the second time lag ΔT2 is set. The second time lag ΔT2 in the second timing circuit 432 starts when the frequency relay supplies to said second timing circuit an activating signal. After said time lag, an activating signal is supplied to the operating circuit 432 and thereby said operating circuit activates the protective device-controlled current interrupter 8 which thus breaks the current in line 6 between said node and transformer, as a load disconnection.

If during said second time lag, the instantaneous voltage amplitude of the ac voltage is considerably changed, a new time lag is set in dependence on the change of the voltage amplitude by supplying a new signal, representing said new time lag, to the second timing circuit 431.

Figure 3B:
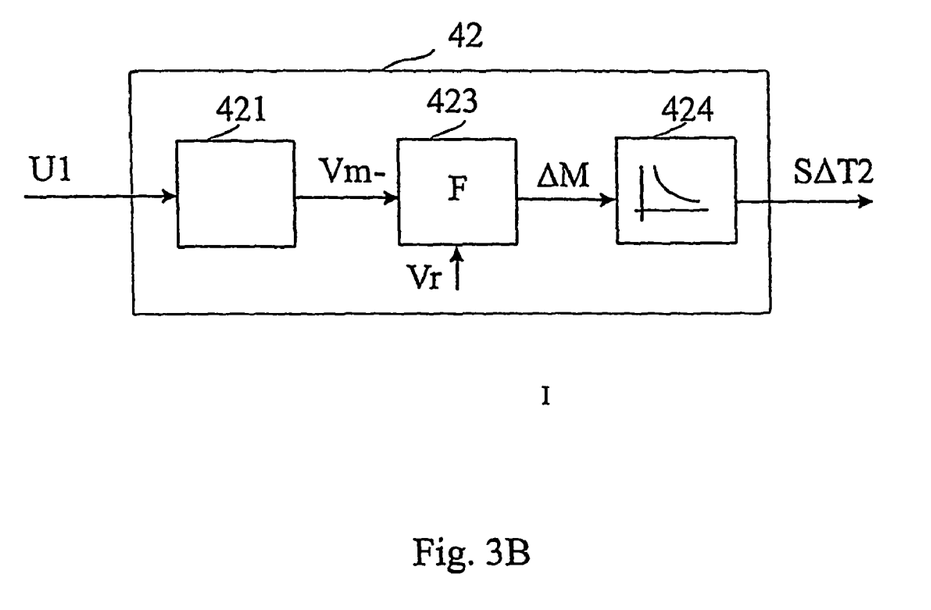
FIG. 3B shows a calculation unit comprised in the invention as a single-line diagram and a block diagram.

FIG. 3B shows an embodiment of said calculating unit 42 comprising a second measurement value-forming circuit 421, a first calculating circuit 423, and a second calculating circuit 424.

The measured value U1 representing an ac voltage is supplied to the second measurement value-forming circuit 421 in the calculating unit 42, which second measurement value-forming circuit in dependence thereon forms a value Vm representing an instantaneous amplitude value of said ac voltage. The first calculating circuit 423 is then supplied with the measured value representing an instantaneous amplitude value Vm of the ac voltage and a reference amplitude value Vr. The reference amplitude value Vr has, for example, a value corresponding to the desired voltage in the node. The first calculating circuit forms a measure of the magnitude, ΔM, of the deviation of said instantaneous voltage amplitude value from the reference amplitude value according to at least two different ways, for example as the absolute value |ΔU| of the difference ΔU of the amplitude deviation of the instantaneous amplitude value Vm from the reference amplitude value Vr, $$|\Delta U| = |Vr - Vm| \qquad (1)$$

Said measure of the magnitude ΔM is in this case equal to the absolute value |ΔU| of said difference, which measure of the magnitude is then supplied to the second calculating circuit 424, in which a second time lag ΔT2 is selected in dependence on said measure of the magnitude. The second time lag ΔT2 is formed in a plurality of different ways, for example as an inverse time lag in dependence on said measure of the magnitude, in this case the absolute value of said difference. The greater the difference, the shorter the time represented by the time lag, $$\Delta T2 = G1(1/(|\Delta U|)) \qquad (2)$$

In the second calculating circuit there is then formed, in dependence on the second time lag ΔT2, said signal SΔT2, representing the second time lag ΔT2. Said signal is supplied to the second timing circuit 431, which signal sets the second time lag ΔT2 in said second timing circuit.

Another advantageous embodiment is to form, as a measure of the magnitude of the change of said instantaneous voltage amplitude value relative to the reference amplitude value, a quotient Vm/Vr of the instantaneous amplitude value and the reference amplitude value. Said quotient is then supplied to the second calculating circuit 424, in which the second time lag ΔT2 in this case is selected in dependence on the natural logarithm of said quotient according to the following function $$\Delta T2 = G2 = A + B*ln(Vm/Vr) \quad (3)$$

Where A and B are constants. In the second calculating circuit there is then formed in the same way as described above, in dependence on the second time lag ΔT2, said signal SΔT2 representing the second time lag ΔT2.

When the above-mentioned functions (1-3) are implemented as software, for example in a microprocessor, the range of validity for the functions is limited to relevant values; time lags may, for example, only receive positive values.

A further calculating model for selecting said second time lag ΔT2 is in dependence on a magnitude derived from the ac voltage, such as, for example, the time derivative of the amplitude of the voltage. The second time lag ΔT2 may also be set as a predetermined value, as a definite time lag.

In still another embodiment for production disconnection, when the second time lag ΔT2 is selected to be formed as an inverse time lag in dependence on said measure of the magnitude and said measure of the magnitude is selected to be formed as a quotient Vm/Vr of the instantaneous amplitude value and the reference amplitude value, said measure of the magnitude is inverted in the above function for inverse time lag (2); the larger the quotient Vm/Vr, the shorter will be the time lag it represents.

The protective device in the embodiment according to the invention includes the following parameters which may be set in advance: the reference frequency values Fr1− Fr2− Fr1+ and Fr2+, the reference amplitude value Vr and the time lag ΔT1. The current value of each of said parameters is set prior to starting the protective device, in accordance with the predetermined connection plan applicable to said electric power system.

Figure 4A:
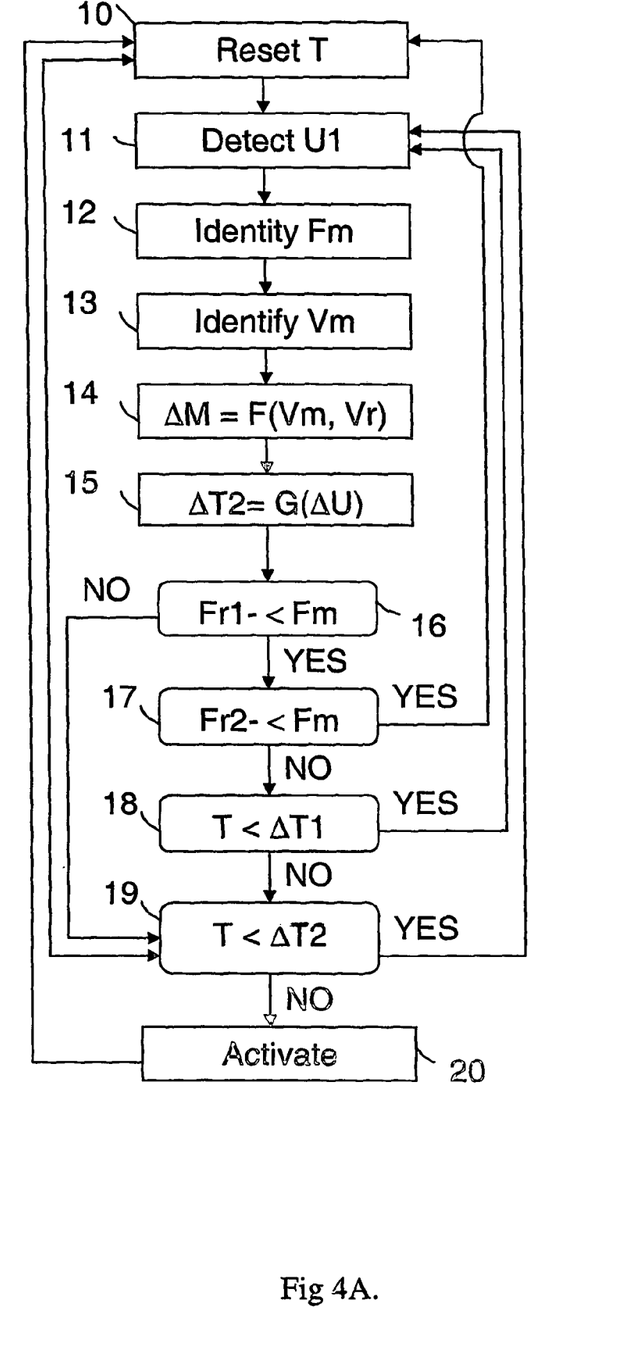
FIG. 4A shows an embodiment of the invention as a flow chart, and, FIG. 4B shows a further embodiment of the invention as a flow chart.

FIG. 4A shows as a block diagram and a flow chart an embodiment of the method for load disconnection implemented as a program in a microprocessor, in a computer program, or as a computer program code element carried out in a computer or a computer process in the protective device 4B. A current run time T is introduced, the current run time at each point in time being the same as the current time minus the current time at the moment of resetting the current run time.

A current run time T for the circuit is reset (10).

An ac voltage-representing measured value U1 is sensed (11).

The instantaneous frequency Fm of the ac voltage is identified (12).

The amplitude Vm of the ac voltage is identified (13).

A measure of the magnitude, ΔM, of the deviation of the amplitude Vm of the ac voltage in comparison with a reference amplitude value Vr is formed (14).

A selecting function is carried out where a time lag ΔT2 is selected in dependence on a measure of the magnitude ΔM (15).

The instantaneous frequency Fm of the ac voltage is compared with a first reference frequency value Fr1−. If the reference frequency value is smaller than the instantaneous frequency, the next step (17) is carried out; if the reference frequency value is larger than the instantaneous frequency, the next step is omitted and the flow is resumed in the indicated step (19), (16).

The instantaneous frequency Fm of the ac voltage is compared with a second reference frequency value Fr2−. If the reference frequency value is smaller than the instantaneous frequency, the flow is restarted (10); if the reference frequency value is larger than the instantaneous frequency, the next step is carried out (18), (17).

The current run time T is compared with a first time lag ΔT1. If the current run time is smaller than the first time lag, a new instantaneous frequency is sensed (11); if the current run time is larger than a first time lag, the next step is carried out (19), (18).

The current run time T is compared with a second time lag ΔT2. If the current run time is smaller than the second time lag, a new instantaneous frequency is detected (11); if the current run time is larger than a second time lag, the next step is carried out (20), (19).

An activating signal is sent and the flow is restarted (10), (20).

The embodiment described above is advantageously implemented as a protection principle in a protective device such as a microprocessor-based frequency relay protection device, for example as an underfrequency relay protection device intended for underfrequency-controlled load disconnection in an electric power system, for example in a transformer station.

Figure 4B:
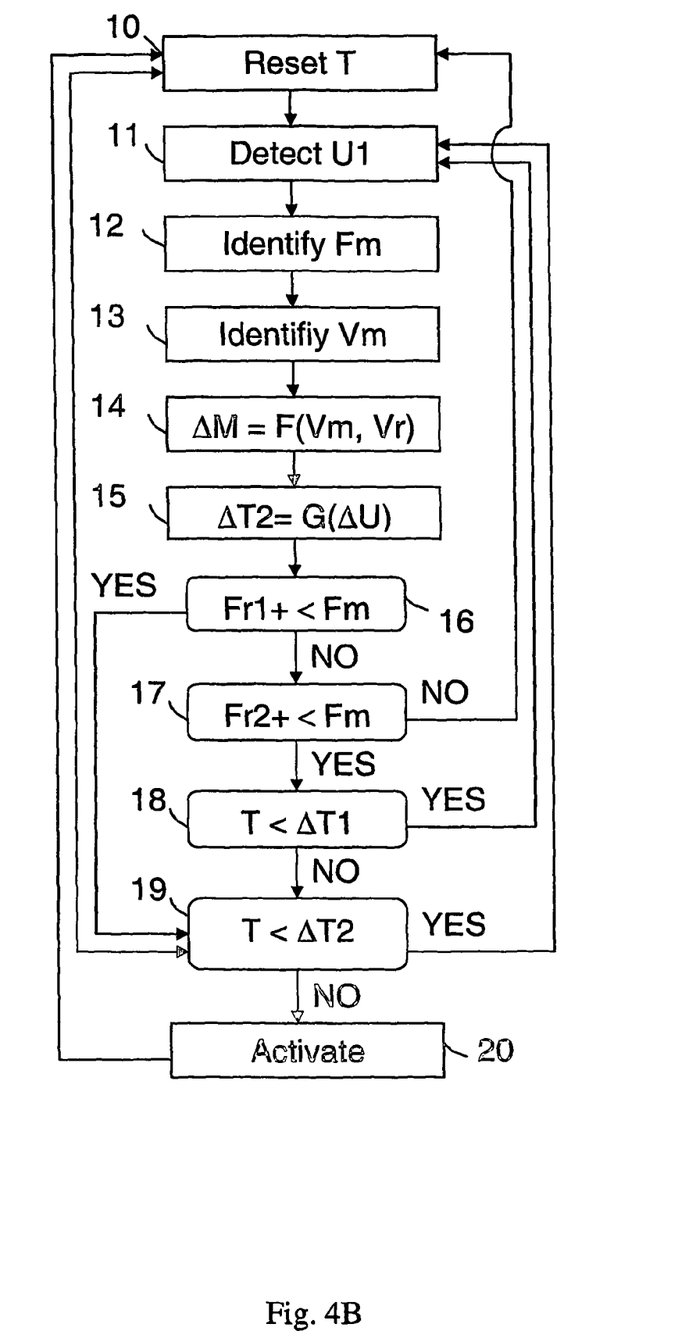

FIG. 4B shows as a block diagram and a flow chart an embodiment of a method for production disconnection implemented as a program in a microprocessor, in a computer program or as a computer program code element carried out in a computer or a computer process in the protective device 4B.

The block diagram and a flow chart for an embodiment of a method for production disconnection differ from the above-described block diagram and a flow chart for the method for load disconnection only by replacing the first reference frequency value Fr1− by a third reference frequency value Fr1+ and by replacing the second reference frequency value Fr2− by a fourth reference frequency value Fr2+, and by replacing the following part of the flow (14):

"The instantaneous frequency Fm of the ac voltage is compared with a first reference frequency value Fr1−. If the reference frequency value is smaller than the instantaneous frequency, the next step (17) is carried out; if the reference frequency value is larger than the instantaneous frequency, the next step is omitted and the flow is resumed in the indicated step (19), (16).

The instantaneous frequency Fm of the ac voltage is compared with a second reference frequency value Fr2−. If the reference frequency value is smaller than the instantaneous frequency, the flow is restarted (10); if the reference frequency value is larger than the instantaneous frequency, the next step is carried out (18), (17)"

by the following:

"The instantaneous frequency Fm of the ac voltage is compared with a third reference frequency value Fr1+. If the reference frequency value is smaller than the instantaneous frequency, the next step is omitted and the flow is resumed in the indicated step (19); if the reference frequency value is larger than the instantaneous frequency, the next step is carried out (22), (21).

The instantaneous frequency Fm of the ac voltage is compared with a fourth reference frequency value Fr2+. If the reference frequency value is smaller than the instantaneous frequency, the next step is carried out (18); if the reference frequency value is larger than the instantaneous frequency, the flow is restarted (10), (22)".

The invention is not limited to the embodiments shown but the person skilled in the art may, of course, modify it in a plurality of ways within the scope of the invention as defined by the claims. Thus, the amplitude value of said ac voltage may be sensed as an RMS value, a mean value, or a symmetrical component in a three-phase voltage. The parameters reference frequency values, reference amplitude value and time lags, which are included in the protective device and may be set and calculated in advance, may be influenced over a network such as the Internet, an intranet or, for example, via electronic mail. Also the choice of calculation model for the purpose of selecting the second time lag ΔT2 in the second calculating circuit may be carried out in this way.

One or more computer programs or computer program products including computer architecture or computer program code elements intended to carry out a method in accordance with the invention on a computer or in a computer process, may be stored, at least in part, in or on different media which are computer-readable. They may also be included as part of a distributed application, which application is possible to carry out on several different computers or computer systems simultaneously or at more or less the same time.

The invention claimed is:

1. A method for stabilization of a power balance in an electric power system comprising a plurality of nodes, the method comprising:
    sensing an instantaneous value of a mains frequency of the electric power system;
    determining a frequency deviation of the instantaneous value from a reference frequency;
    disconnecting in a node a selected part of the electric power system connected to the node in dependence on the frequency deviation, wherein each node of the system is associated with part of the electric power system, and wherein each part of the electric power system is a power producer or a load;
    sensing a voltage amplitude value in the node;
    calculating a magnitude of a deviation of the voltage amplitude value from a reference amplitude;
    calculating a time lag in dependence on a measure of the magnitude of the deviation;
    disconnecting the selected part of the electric power system from the node at a point in time in dependence on the time lag; and
    repeating the method for other nodes of the electric power system and disconnecting selected parts of the electric power system until the power balance in the electric power system is stabilized.

2. The method according to claim 1, wherein the magnitude of the deviation is calculated as the absolute value of a difference of the voltage amplitude value and a reference amplitude value.

3. The method according to claim 1, wherein the magnitude of the deviation is calculated as a quotient of the instantaneous amplitude value and the reference amplitude value.

4. The method according to claim 1, wherein the time lag is calculated as an inverse time lag in dependence on the magnitude of the deviation.

5. The method according to claim 1, wherein the time lag is calculated as a function of a logarithm of the magnitude of the deviation.

6. The method according to claim 1, wherein the selected part of the electric power system comprises a load, wherein the reference frequency value is chosen as a lower limit of the instantaneous value of the mains frequency of the electric power system, and wherein the selected part of the electric power system is disconnected if the frequency deviation indicates that the instantaneous value of the mains frequency of the electric power system falls below the reference frequency value.

7. The method according to claim 1, wherein the selected part of the electric power system is power-producing, wherein the reference frequency value is chosen as an upper limit of the instantaneous value of the mains frequency of the electric power system, and wherein the selected part of the electric power system is disconnected if the frequency deviation indicates that the instantaneous value of the mains frequency of the electric power system exceeds the reference frequency value.

8. A device for stabilization of a power balance in an electric power system comprising a plurality of nodes, the device comprising:
    a sensor configured to sense an instantaneous value of a mains frequency of the electric power system,
    a processor configured to determine a frequency deviation of the instantaneous value from a reference frequency value,
    a disconnector configured to disconnect, in dependence on the frequency deviation, a selected part of the electric power system connected to a node, wherein each node of the system is associated with part of the electric power system, and wherein each part of the electric power system is a power producer or a load,
    a sensor configured to sense in the node a voltage amplitude value for an ac voltage in the node;
    a circuit configured to calculate, in dependence on the voltage amplitude value, a measure of a magnitude of the deviation of the voltage amplitude value from a reference amplitude value for the node;
    a circuit configured to calculate a time lag in dependence on the measure of the magnitude; and
    a disconnector configured to disconnect, in dependence on the frequency deviation, a selected part of the electric power system connected to a node, and for disconnecting the selected part of the electric power system in dependence on the time lag,
    wherein the device disconnects other parts of the electric power system connected to other nodes of the electric power system until the power balance in the electric power system is stabilized.

9. The device according to claim 8, wherein the circuit configured to calculate, in dependence on the voltage amplitude value, a measure of the magnitude of the deviation of the voltage amplitude value from a reference amplitude value for the node comprises a circuit configured to calculate a difference of the voltage amplitude value and the reference amplitude value.

10. The device according to claim 8, wherein the circuit configured to calculate, in dependence on the voltage amplitude value, a measure of the magnitude of the deviation of the voltage amplitude value from a reference amplitude value for the node comprises a circuit configured to calculate a quotient of the voltage amplitude value and the reference amplitude value.

11. The device according to claim 8, wherein the circuit configured to calculate a time lag comprises a circuit configured to calculate an inverse time lag in dependence on the measure of the magnitude.

12. The device according to claim 8, wherein the circuit configured to calculate a time lag comprises a circuit configured to calculate the time lag in dependence on a function of the logarithm of the measure of the magnitude.

13. The device according to claim 8, wherein the selected part of the electric power system comprises a load, the device further comprising:
    a comparison circuit configured to detect if the instantaneous value of the frequency mains of the electric power system falls below a reference frequency value supplied thereto, selected as a smallest permissible instantaneous value of the mains frequency of the electric power system.

14. The device according to claim 8, wherein the selected part of the electric power system comprises a power-producing part, the device further comprising:

a comparison circuit configured to detect if the instantaneous value of the mains frequency of the electric power system exceeds a reference frequency value supplied thereto, selected as a largest permissible instantaneous value of the mains frequency of the electric power system.

15. The device according to claim 8, further comprising:

a computer control system comprising computer program instructions executable by a processor to simulate a method for stabilizing the power balance, the method comprising sensing an instantaneous value of a mains frequency of the electric power system, determining a frequency deviation of the instantaneous value from a reference frequency, disconnecting in a node a selected part of the electric power system connected to the node in dependence on the frequency deviation, sensing a voltage amplitude value in the node, calculating a magnitude of a deviation of the voltage amplitude value from a reference amplitude, calculating a time lag in dependence on a measure of the magnitude of the deviation; disconnecting the selected part of the electric power system from the node at a point in time in dependence on the time lag; and repeating the method for other nodes of the electric power system and disconnecting selected parts of the electric power system until the power balance in the electric power system is stabilized.

16. A computer program product, comprising a computer readable medium; and program instructions recorded on the computer readable medium and executable by a processor for carrying out a method for stabilizing a power balance in an electric power system comprising a plurality of nodes, wherein each node of the system is associated with part of the electric power system, and wherein each part of the electric power system is a power producer or a load, the method comprising sensing an instantaneous value of a mains frequency of the electric power system, determining a frequency deviation of the instantaneous value from a reference frequency, disconnecting in in a node a selected part of the electric power system connected to the node in dependence on the frequency deviation, sensing a voltage amplitude value in the node, calculating a magnitude of a deviation of the voltage amplitude value from a reference amplitude, calculating a time lag in dependence on a measure of the magnitude of the deviation; disconnecting the selected part of the electric power system from the node at a point in time in dependence on the time lag; and repeating the method for other nodes of the electric power system and disconnecting selected parts of the electric power system until the power balance in the electric power system is stabilized.

* * * * *